US012624260B2

(12) United States Patent
Yook et al.

(10) Patent No.: US 12,624,260 B2
(45) Date of Patent: May 12, 2026

(54) OPTICALLY CLEAR SILICONE ACRYLATE ADHESIVE COMPOSITION

(71) Applicant: Dow Silicones Corporation, Midland, MI (US)

(72) Inventors: Juyoung Yook, Chungcheongbuk-do (KR); Minkyu Kyeong, Chungcheongbuk-do (KR); Hyochul Kim, Chungcheongbuk-do (KR)

(73) Assignee: Dow Silicones Corporation, Midland, MI (US)

( * ) Notice: Subject to any disclaimer, the term of this patent is extended or adjusted under 35 U.S.C. 154(b) by 99 days.

(21) Appl. No.: 19/099,918

(22) PCT Filed: Aug. 8, 2023

(86) PCT No.: PCT/US2023/029702
§ 371 (c)(1),
(2) Date: Jan. 30, 2025

(87) PCT Pub. No.: WO2024/039544
PCT Pub. Date: Feb. 22, 2024

(65) Prior Publication Data
US 2025/0257250 A1     Aug. 14, 2025

Related U.S. Application Data

(60) Provisional application No. 63/398,551, filed on Aug. 17, 2022.

(51) Int. Cl.
| | |
|---|---|
| C09J 151/08 | (2006.01) |
| B41J 2/01 | (2006.01) |
| C08F 2/50 | (2006.01) |
| C08F 220/10 | (2006.01) |
| C08F 222/10 | (2006.01) |
| C08F 283/00 | (2006.01) |
| C08G 77/00 | (2006.01) |
| C08G 77/16 | (2006.01) |
| C08G 77/38 | (2006.01) |
| C08G 77/445 | (2006.01) |
| C08G 77/50 | (2006.01) |
| C08K 5/00 | (2006.01) |
| C08L 33/06 | (2006.01) |
| C09J 5/00 | (2006.01) |
| C09J 9/00 | (2006.01) |
| C09J 183/04 | (2006.01) |
| C08F 283/12 | (2006.01) |
| C09J 4/06 | (2006.01) |

(52) U.S. Cl.
CPC .............. *C09J 151/08* (2013.01); *B41J 2/01* (2013.01); *C08F 2/50* (2013.01); *C08F 220/10* (2013.01); *C08F 222/1006* (2013.01); *C08F*
283/00 (2013.01); *C08G 77/16* (2013.01); *C08G 77/38* (2013.01); *C08G 77/445* (2013.01); *C08G 77/50* (2013.01); *C08G 77/70* (2013.01); *C08G 77/80* (2013.01); *C08K 5/0025* (2013.01); *C08L 33/066* (2013.01); *C09J 5/00* (2013.01); *C09J 9/00* (2013.01); *C09J 183/04* (2013.01); *C08F 283/12* (2013.01); *C08K 2201/019* (2013.01); *C09J 4/06* (2013.01); *C09J 2301/416* (2020.08)

(58) Field of Classification Search
None
See application file for complete search history.

(56) References Cited

U.S. PATENT DOCUMENTS

| | | | |
|---|---|---|---|
| 7,943,681 B2 | 5/2011 | Lee et al. | |
| 8,338,515 B1 | 12/2012 | Parr et al. | |
| 8,569,416 B2 | 10/2013 | Evans et al. | |
| 2011/0081505 A1* | 4/2011 | Sherman ................. | C08L 83/00 |
| | | | 428/344 |
| 2011/0165361 A1 | 7/2011 | Sherman et al. | |

FOREIGN PATENT DOCUMENTS

| | | |
|---|---|---|
| JP | 2020196829 | 12/2020 |
| JP | 2020196830 | 12/2020 |
| WO | 2017039857 | 3/2017 |
| WO | 2018003381 | 1/2018 |
| WO | WO-2022132906 A1 * | 6/2022 ........... C09D 183/06 |

OTHER PUBLICATIONS

Smith, "The Analytical Chemistry of Silicones", John Wiley & Sons, 1991, p. 347.

* cited by examiner

*Primary Examiner* — Eli D. Strah
(74) *Attorney, Agent, or Firm* — Steven W. Mork

(57) ABSTRACT

A composition includes: (a) 10-90 mass-percent of an organopolysiloxane resin; (b) 10-90 mass-percent of a (meth)acrylate component consisting of: (i) at least one monofunctional (meth)acrylate that contains an ether group and/or a hydroxyl group; and optionally (ii) at least one monofunctional (meth)acrylate containing alkyl groups and that is free of ether and hydroxyl groups; where the molar ratio of (ii) to (i) is in a range of 0:1 to 22:1 and wherein when the (meth)acrylate component comprises a monofunctional (meth)acrylate that contains a hydroxyl group then it also comprises as part of component (i) at least one of a monofunctional (meth)acrylate that contains an ether group and/or component (ii) a monofunctional (meth)acrylate containing alkyl groups and that is free of ether and hydroxyl groups; (c) 0.11-11 mass-percent of a crosslinker; and (d) 0.1-10 mass-percent of a photoradical initiator; where mass-percentages are relative to the combined mass of components (a)-(c).

10 Claims, No Drawings

OPTICALLY CLEAR SILICONE ACRYLATE ADHESIVE COMPOSITION

FIELD OF THE INVENTION

The present invention relates to curable silicone-based compositions that cure under ultraviolet light exposure to optically clear adhesive materials.

INTRODUCTION

Photocurable optically clear adhesives, particularly photocurable liquid optically clear adhesives, have application in optical bonding for electronic devices such as optical displays. Photocurable optically clear adhesives optically couple elements in display applications where optically coupled elements can include display panels, glass plates, touch panels, diffuser, stiffness compensators, heaters and flexible films such as polarizers and retarders.

(Meth)acrylate materials are common in photocurable adhesives. However, (meth)acrylate compositions tend to suffer from shrinkage when they cure, particularly when large amounts of acrylate monomer is present to keep the composition viscosity low enough to facilitate inkjet printing of the composition. Shrinkage corresponds to dimensional instability, which is undesirable in an adhesive because it can result in pulling away or delamination from the elements the adhesive is to be adhering together. It is known that adding plasticizer to a (meth)acrylate composition can reduce shrinkage of the composition during curing, but then the composition retains residual plasticizer and that is often undesirable. So it would be desirable to avoid use of plasticizers.

It would advance the art of photocurable optically clear adhesives to identify a (meth)acrylate composition that serves as s photocurable adhesive that has a viscosity at 25 degrees Celsius (° C.) in a range of 10-100,000 millipascal*seconds (mPa*s), and preferably that has a viscosity of at least 10 mPa*s at 25° C. while at the same time having a viscosity of 50 mPa*s or lower at 60° C. so it is suitable for inkjet applications, and that after photocuring has a transparency of greater than 90% at 550 nanometers through a one millimeter thick film of cured composition, a shear storage modulus in a range of one to 5,000 kiloPascals (kPa) at one hertz and 1% shear rate over 25-80° C., peal adhesion to polyethylene terephthalate (PET) of greater than 38.6 Newtons per meter (greater than 100 gram force per inch) and that experiences less than 8% shrinkage upon curing as described herein below. It is particularly desirable to achieve those properties without use of a plasticizer.

BRIEF SUMMARY OF THE INVENTION

The present invention solves the problem of providing a photocurable optically clear adhesive in the form of a (meth)acrylate composition having a viscosity at 25 degrees Celsius (° C.) in a range of 10-100,000 millipascal*seconds (mPa*s), and even can have a viscosity of at least 10 mPa*s at 25° C. while at the same time having a viscosity of 50 mPa*s or lower at 60° C. so it is suitable for inkjet applications, and that after photocuring has a transparency of greater than 90% at 550 nanometers through a one millimeter thick film of cured composition, a storage modulus in a range of one to 5,000 kiloPascals (kPa) at one hertz and 1% shear rate over 25-80° C., peal adhesion to PET of greater than 38.6 Newtons per meter (greater than 100 gram force per inch) and that experiences less than 8% shrinkage upon curing as described herein below. It has been discovered that the composition of the present invention can achieve these properties without use of a plasticizer. It has also been discovered that the inventive composition can be inkjet dispensable.

The present invention is a result of surprisingly and unexpectedly discovering that including in the (meth)acrylate photocurable composition of the present invention an organopolysiloxane resin containing at least 50 mol-percent (mol %) "T" siloxane units where the molar ratio of alkyl to aryl groups in the organopolysiloxane resin is in a range of 0:1 to 4:1 and the concentration of hydroxyl and alkoxyl groups (collectively "OZ" groups) bonded to silicon atoms in the organopolysiloxane is in a range of zero to 100 mole-percent based on moles of organopolysiloxane resin serves as an adhesion promoter and enables solving the aforementioned problems. Of particular surprise is the fact that the organopolysiloxane resin reduces shrinkage of the composition upon curing.

In a first aspect, the present invention is a composition comprising the following components: (a) 10 to 90 mass-percent of an organopolysiloxane resin containing at least 50 mole-percent T siloxane units where the molar ratio alkyl groups to aryl groups in the organopolysiloxane resin is in a range of 0:1 to 4:1; (b) 10 to 90 mass-percent of a (meth)acrylate component consisting of: (i) at least one monofunctional (meth)acrylate that contains an ether group and/or a hydroxyl group; and optionally (ii) at least one monofunctional (meth)acrylate containing alkyl groups and that is free of ether and hydroxyl groups; where the molar ratio of (ii) to (i) is in a range of 0:1 to 22:1 and wherein when the (meth)acrylate component comprises a monofunctional (meth)acrylate that contains a hydroxyl group then it also comprises as part of component (i) at least one of a monofunctional (meth)acrylate that contains an ether group and/or component (ii) a monofunctional (meth)acrylate containing alkyl groups and that is free of ether and hydroxyl groups; (c) 0.1 to 11 mass-percent of a crosslinker having an average of at least two ethylenically unsaturated double bonds per molecule; and (d) 0.1 to 10 mass-percent of a photoradical initiator; where mass-percentages are relative to the combined mass of components (a)-(c) and wherein the mass percentage of components (a)-(c) add up to 100 mass-percent.

In a second aspect, the present invention is a process comprising using the composition of the first aspect as an adhesive, the process comprising the steps of applying the composition onto a first object and then applying a second object to the composition so as to sandwich the composition between and in contact with the first and second objects.

The composition of the present invention can be useful as an optically clear adhesive.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; JIS refers to Japanese Industrial Standards, and ISO refers to International Organization for Standards.

Products identified by their tradename refer to the compositions available under those tradenames on the priority date of this document.

"Multiple" means two or more. "And/or" means "and, or as an alternative". All ranges include endpoints unless otherwise indicated. Identification of materials by trademark or tradename refers to materials having the composition as sold under that trademark or tradename at the priority date of this document.

The general terms "$C_{x-y}$", "$C_x$-$C_y$", "$C_x$ to $C_y$", and "$C_x$—$C_y$" are interchangeable in the context of chemical structures and refers to having from x to y carbon atoms in the chemical structure.

Molecular weight herein refers to weight-average molecular weight (Mw) when in reference to polymers. Determine Mw for polymers using gel permeation chromatography (GPC) using a Waters 2695 Separation Module with a Waters 2487 ultraviolet (UV) detector, and using as columns three STYRAGEL™ HR columns (7.8 by 300 millimeters with a molecular weight separation range of 100 to 4,000,000) and a STYRAGEL™ protection column with THE (7.8 by 200 millimeters). STYRAGEL is a trademark of Millipore Corporation. Prepare samples as a 0.5 masspercent (mass %) solution in toluene and filter through a 0.45 micrometer polytetrafluoroethylene syringe filter. Use a flow rate of one milliliter per minute, column and detector temperatures of 35 degrees Celsius (° C.), injector volume of 100 microliters, and a running time of 60 minutes. Calculate Mw relative to linear polystyrene standards covering the molecular weight range of 580 to 2, 610,000.

"(Meth)acryloyloxy group" refers to an acryloyloxy group and/or a methacryloyloxy group. An acryloyloxy group has the chemical structure: $H_2C$=CH—C(O)O—. A methacryloyloxy group has the chemical structure: $H_2C$=C($CH_3$)—C(O)O—.

"Siloxane" refers to molecules comprising at least one siloxane (Si—O—Si) bond. Herein, "siloxane" can be a "polysiloxane" having multiple siloxane bonds or a siloxane having only one siloxane bond. The term "polysiloxane" is used when meaning a siloxane having more than one siloxane bond. Polysiloxanes can have chain, ring, ladder and three-dimensional network structures.

Polysiloxanes comprise multiple siloxane units linked together through siloxane bonds. Siloxane units can be characterized by the designation M, D, T or Q. There are two generally accepted usages of MDTQ nomenclature: GE method and an NMR method. Usage herein is in accordance with the following NMR method. Unless expressly stated otherwise: "M" correspond to $R_3SiO_{1/2}$ siloxane units. "D" correspond to the combination of $R_2SiO_{2/2}$ and $R_2(OZ)SiO_{1/2}$ siloxane units. "T" corresponds to the combination of $RSiO_{3/2}$, $R(OZ)SiO_{2/2}$, and $R(OZ)_2SiO_{1/2}$ siloxane units. "Q" corresponds to a combination of $(OZ)_3SiO_{1/2}$, $(OZ)_2SiO_{2/2}$, $(OZ)SiO_{3/2}$, and $SiO_{4/2}$ siloxane units. "R" is independently in each occurrence selected from hydrocarbyl groups and can be an alkyl or aryl. Preferably, R is selected from a group consisting of C1-C8 alkyls (such as methyl, ethyl, propyl, methyl, butyl, pentyl, hexyl, heptyl and octyl) and C6-C20 aryls (including phenyl and benzyl). "OZ" is —OH or —OR, where R is as described above.

Notably, an oxygen atom having a multiple of "½" subscript is an oxygen of a siloxane bond that is shared with a silicon atom of two siloxane units including the one of the subject siloxane unit. The numerator of the subscript indicates how many shared oxygen atoms are attached to the silicon atom. For example $SiO_{3/2}$ has three siloxane bonded oxygen atoms.

The M, D and T notations can include a superscript indicating what R groups are bound to the silicon atom of the siloxane unit. If no superscript notation is used then it is assumed the R groups are all methyl groups. For instance, $T^{Pr}$ refers to a T unit where the R group is an n-propyl group. $T^{Ph}$ unit refers to a T unit where the R group is a phenyl group. $T^{MA}$ unit refers to a T unit where the R group is a (meth)acryloyloxypropyl group. D, $D^{Me,Me}$ and $D^{Me}_2$ each refer to a D unit with two methyl R group on the silicon atom. $D^{Ph,Me}$ and $D^{Ph}$ both refer to a D unit with one phenyl R group and one methyl R group on the silicon atom. $D^{Ph,Ph}$ and $D^{Ph}_2$ both refer to a D unit with two phenyl R group on the silicon atom. $M^{Me,Me,Me}$ and $M^{Me}_3$ both refer to a M unit with three methyl R group on the silicon atom.

Chemical formula designations for polysiloxanes using M, D, T, Q nomenclature typically have subscripts associated with the siloxane unit designator that can either refer to the average mole ratio of that siloxane unit relative to all siloxane units in the molecule or the average number of the associate siloxane units in the molecule. When the subscript associated with a siloxane unit is greater than or equal to one, then the subscript refers to the average number of those siloxane units in the molecule. When the subscript associated with a siloxane unit is less than one then the subscript refers to the average mole ratio of that siloxane unit relative to the number of moles of all siloxane units in the molecule. An absence of a subscript implies a subscript value of one.

"Organopolysiloxane" refers to a polysiloxane that has at least one organic group bound to a silicon atom of the polysiloxane.

"Optically clear", or "optical clarity" refers to a material that has at least 90 percent transmittance at a wavelength of 550 nanometers when measured through a 1.0 millimeter thick film of the material. Measure transmittance as described in the Examples section, below.

The composition of the present invention comprises: (a) an organopolysiloxane resin; (b) a (meth)acrylate component; (c) a crosslinker; and (d) a photoradical initiator.

The organopolysiloxane resin contains at least 50 mole-percent "T" siloxane units and can contain 50 mol % or more, 60 mol % or more, 70 mol % or more, even 80 mol % or more while at the same time typically contains 100 mol % or less, 90 mol % or less, 80 mol % or less, 75 mol % or less, 70 mol % or less, even 60 mol % or less T siloxane units based on all siloxane units in the organopolysiloxane resin.

The molar ratio of alkyl groups to aryl groups in the organopolysiloxane resin is 0:1 or more and can be 0.1:1 or more, 0.2:1 or more, 0.4:21 or more, 0.7:1 or more, 1:1 or more 1.2:1 or more, 1.5:1 or more, 2.0:1 or more, 2.5:1 or more, 3.0:1 or more, even 3.5:1 or more while at the same time is typically 4.0:1 or less, and can be 3.5:1 or less, 3.0:1 or less, 2.5:1 or less; 2:1 or less, 1.5:1 or less, 1.2:1 or less, 1.1:1 or less, 1.0:1 or less; 0.7:1 or less, 0.4:1 or less, 0.2:1 or less, or even 0.1:1 or less. Desirably, the alkyl groups are independently in each occurrence selected from C1 to C8 alkyl groups such as methyl, ethyl, propyl, butyl, pentyl, hexyl, heptyl and octyl groups. Desirably, the aryl groups are selected from C6 to C20 aryl groups including aryl and phenyl.

Desirably, the organopolysiloxane resin has an OZ concentration of zero mol % or more and can be 5 mol % or more, 10 mol % or more, 20 mol % or more, 30 mol % or more, 40 mol % or more. 50 mol % or more, 50 mol % or more, 60 mol % or more, 70 mol % or more, 80 mol % or more, even 90 mol % or more while at the same time is typically 100 mol % or less, and can be 90 mol % or less, 80 mol % or less, 70 mol % or less, 60 mol % or less, 50 mol % or less, 40 mol % or less, 30 mol % or less, 20 mol % or less, even 10 mol % or less based on moles of organopolysiloxane resin. Desirably, the OZ groups are hydroxyl groups.

Determine the molar ratio of alkyl to aryl groups and OZ concentration in the organopolysiloxane resin using $^{29}Si$, $^{13}C$ and $^{1}H$ nuclear magnetic resonance spectroscopy (see, e.g., *The Analytical Chemistry of Silicones*, Smith, A. Lee, ed., John Wiley & Sons: New York, 1991, p. 347ff.).

The organopolysiloxane resin can have an average chemical formula (I):

$$M_aD_bT_cQ_d \qquad (I)$$

where:

subscript a is the molar ratio of M siloxane units relative to all siloxane units in the organopolysiloxane resin and has an average value of zero or greater and can have an average value of 0.10 or more, 0.15 or more, 0.20 or more, even 0.25 or more while at the same time typically has an average value of 0.35 or less, and can be 0.30 or less, 0.28 or less, 0.25 or less, 0.20 or less, even 0.15 or less;

subscript b is the molar ratio of D siloxane units relative to all siloxane units in the organopolysiloxane resin and has an average value of zero or greater and can have an average value of 0.10 or more, 0.15 or more, 0.20 or more, even 0.25 or more while at the same time typically has an average value of 0.35 or less, and can be 0.30 or less, 0.25 or less, 0.20 or less, even 0.15 or less;

subscript c is the molar ratio of T siloxane units relative to all siloxane units in the organopolysiloxane resins and has an average value of 0.50 or more and can have an average value of 0.60 or more, 0.70 or more, 0.80 or more, even 0.90 or more while at the same time typically has an average value of 1.00 or less, even 0.90 or less, 0.80 or less, 0.70 or less, even 0.60 or less;

subscript d is the molar ratio of Q siloxane units relative to all siloxane units in the organopolysiloxane resin and has an average value of zero or greater and can have an average value of 0.10 or more, 0.15 or more, 0.20 or more, 0.25 or more, 0.30 or more, even 0.35 or more while at the same time typically has an average value of 0.50 or less, 0.40 or less, 0.30 or less, 0.25 or less, 0.20 or less, even 0.15 or less;

the sum of subscripts a+b+c+d is equal to 1.00; and the molar ratio of alkyl to aryl groups and the concentration of OZ are as described above for the organopolysiloxane resin 8/6.

Desirably the ratio of subscripts a/c is in a range of zero to 0.5, the ratio of subscripts b/c is in a range of zero to 0.5, and the ratio of subscripts d/c is in a range of zero to 0.8.

The organopolysiloxane resin typically has a Mw of 1,000 or more, preferably 1200 or more, even more preferably y 1500 or more while at the same time typically has a Mw of 100,000 or less, preferably 10,000 or less, more preferably 5,000 or less.

Methods for preparing suitable organopolysiloxane resins are well established in the art and generally include hydrolyzing an organosilane having three hydrolysable groups on a silicone atom, such as halogen or alkoxy groups, in an organic solvent. Suitable organopolysiloxane resins are also commercially available and include those available under the tradenames: DOWSIL™ RSN-0233 Flake Resin, DOWSIL RSN-0249 Flake resin, DOWSIL RSN-0255 Flake Resin, DOWSIL RSN-6018 Resin Intermediate, DOWSIL RSN-0805 Resin, SILRES™ SY300, SILRES REN168, and SILRES 604. DOWSIL is a trademark of The Dow Chemical Company. SILRES is a trademark of Wacker-Chemie AG.

Examples of suitable organopolysiloxane resins include any one or any combination of more than one selected from those having generally the following average chemical formulae, realizing that the subscripts are ("Ph" refers to phenyl, "Me" refers to methyl, and "Pr" refers to n-propyl):

$T^{Ph}_{70}T^{Pr}_{30}$ having an OZ content of 5.0 mass % OH based on the organopolysiloxane resin mass (36 mol % relative to moles resin), an average Mw of 2,900 g/mol and a molar ratio of alkyl:aryl groups of 0.43:1;

$D^{Ph,Me}_{0.05}D^{Ph,Ph}_{0.10}T^{Me}_{0.45}T^{Ph}_{0.40}$ having an OZ content of 7.1 mass % OH based on the organopolysiloxane resin mass (46 mol % relative to moles resin), an average Mw of 2,500 g/mol, the molar ratio of alkyl: aryl groups is 0.77:1, and the ratio of subscripts b/c is 0.2;

$D^{Me,Me}_{0.15}T^{Me}_{0.40}T^{Ph}_{0.45}$ having an OZ content of 6.5 mass % OH based on the organopolysiloxane resin mass (38 mol % relative to moles resin), an average Mw of 3,055 g/mol, a molar ratio of alkyl:aryl groups of 1.6:1, and the ratio of subscripts b/c is 0.2;

$T^{Ph}_{1.00}$ having an OZ content of 8.5 mass % OH based on the organopolysiloxane resin mass (70 mol % relative to moles resin), an average Mw of 2,660 g/mol and a molar ratio of alkyl:aryl groups of 0:1;

$D^{Me,Me}_{0.15}D^{Ph,Ph}_{0.05}T^{Me}_{0.10}T^{Ph}_{0.70}$ having an OZ content of 6.0 mass % OH based on the organopolysiloxane resin mass (49 mol % relative to moles resin), an average Mw of 3,294 g/mol, a molar ratio of alkyl:aryl groups of 0.5:1, and the ratio of subscripts b/c is 0.3;

$M^{Me,Me,Me}_{0.28}T^{Pr}_{0.25}T^{Ph}_{0.48}$ having an OZ content of 0.0 mass % based on organopolysiloxane resin mass, an average Mw of 3,719/mol, a molar ratio of alkyl:aryl groups of 2.3:1, and the ratio of subscripts a/c is 0.4;

$T^{Ph}_{0.65}Q_{0.35}$ having an OZ content of 7.4 mass % OH based on the organopolysiloxane resin mass (38 mol % relative to moles resin), an average Mw of 1,614 g/mol, a molar ratio of alkyl:aryl groups of 0:1, and the ratio of subscripts d/c is 0.5; and $M^{Me,Me,Me}_{0.12}T^{Ph}_{0.53}Q_{0.35}$ having an OZ content of 5.2 mass % OH based on the organopolysiloxane resin mass (24 mol % relative to mole resin), an average Mw of 3,277 g/mol, a molar ratio of alkyl:aryl groups of 0.68:1, the ratio of subscripts a/c is 0.2, and the ratio of subscripts d/c is 0.7.

The concentration of the organopolysiloxane resin in the composition is 10 mass % or more and can be 20 mass % or more, 30 mass % or more, 40 mass % or more, 50 mass % or more, 60 mass % or more, 70 mass % or more, even 80 mass % or more while at the same time is typically 90 mass % or less, and can be 80 mass % or less, 70 mass % or less, 60 mass % or less, 50 mass % or less, 40 mass % or less, 30 mass % or less, even 20 mass % or less based on the combined mass of (a) organopolysiloxane resin, (b) (meth) acrylate component, and (c) crosslinker. If the concentration of the organopolysiloxane resin in insufficient, then the cured product does not have proper adhesion strength and experiences shrinkage of greater than 8%. If the concentration of the organopolysiloxane is too high, then the cured product is undesirably hard.

The composition of the present invention further comprises a (meth)acrylate component. The (meth)acrylate component consists of: (i) at least one monofunctional (meth) acrylate that contains an ether group and/or a hydroxyl group; and optionally (ii) at least one monofunctional (meth)

acrylate containing alkyl groups and that is free of ether and hydroxyl groups. The molar ratio of (ii):(i) is 0:1 or more and can be 0.2; 1 or more, 0.5:1 or more, 1:1 or more, 2:1 or more, 3:1 or more, 4:1 or more, 5:1 or more, 6:1 or more, 7:1 or more, 8:1 or more, even 9:1 or more and at the same time is typically 22:1 or less and can be 21:1 or less, 20:1 or less, 19:1 or less, 15:1 or less, 10:1 or less, and can be 9:1 or less, 8:1 or less, 7:1 or less, 6:1 or less, 5:1 or less, 4:1 or less, 3:1 or less, 2:1 or less, 1:1 or less, 0.5:1 or less, or even 0.2:1 or less.

It is desirable for the composition of the present invention to cure to an optically clear material. Monofunctional (meth) acrylates containing an ether group and/or a hydroxyl group are necessary to achieve high optical transmittance through the composition once cured. However, it has surprisingly been discovered that in order to achieve optical clarity when using a monofunctional (meth)acrylate containing a hydroxyl group for (i), then the composition must also contain a monofunctional (meth)acrylate containing an ether group and/or a monofunctional (meth)acrylate containing alkyl groups and that is free of ether and hydroxyl groups. Nonetheless, the (meth)acrylate component can comprise monofunctional (meth)acrylate containing an ether group either alone or in combination with a monofunctional (meth) acrylate containing a hydroxyl group and or a monofunctional (meth)acrylate containing an alkyl group and that is free of ether and hydroxyl groups and still achieve optical clarity.

Monofunctional (meth)acrylates containing an ether group and/or a hydroxyl group suitable for use in the (meth)acrylate component include any one or any combination of more than one compound selected from a group consisting of (meth)acrylate functional ethylene glycol, (meth)acrylate functional propylene glycol, (meth)acrylate functional polyethers comprising poly(ethylene oxide) and/ or poly(propylene oxide), and hydroxyl functional (meth) acrylate functional compounds.

Examples of suitable monofunctional (meth)acrylates containing an ether group include methoxyethoxy ethyl acrylate, methoxy polyethylene glycol acrylate, methoxy polypropylene glycol acrylate, phenol ethylene glycol acrylate, phenol diethylene glycol acrylate, phenol tetraethylene glycol, nonyl phenyl ethylene glycol acrylate, di(ethylene glycol) 2-ethylhexyl ether acrylate, and nonyl phenol dipropylene glycol acrylate, 2-(2-ethoxyethoxy)ethyl acrylate; methoxy polyethene glycol 400 acrylate.

Examples of suitable monofunctional (meth)acrylates containing a hydroxyl group include hydroxyl-substituted (meth)acrylate, hydroxyethyl acrylate, hydroxypropyl acrylate, hydroxybutyl acrylate.

Monofunctional (meth)acrylates containing alkyl groups and that are free of ether and hydroxyl groups suitable for use in the (meth)acrylate component can be linear, branched, and/or cyclic.

Examples of linear alkyl(meth)acrylates containing alkyl groups and that are free of ether and hydroxyl groups include any one or any combination of more than one compound selected from a group consisting of hydroxypropyl butyl acrylate, butyl methacrylate, n-hexyl acrylate, n-hexyl methacrylate, ethylhexyl acrylate, n-heptyl acrylate, n-heptyl methacrylate, octyl acrylate, dodecyl acrylate, octyl methacrylate, nonyl acrylate, nonyl methacrylate, lauryl acrylate, lauryl methacrylate, cetyl acrylate, cetyl methacrylate, stearyl acrylate, and stearyl methacrylate.

Examples of branched (meth)acrylates containing alkyl groups and that are free of ether and hydroxyl groups include any one or any combination of more than one compound selected from a group consisting of isononyl acrylate, isooctyl acrylate, isooctyl methacrylate, ethylhexyl acrylate, ethylhexyl methacrylate, 2-methylheptylacryalte, isononyl methacrylate, isobutyl acrylate, isobutyl methacrylate, and isostearyl acrylate.

Examples of cyclic (meth)acrylates containing alkyl groups and that are free of ether and hydroxyl groups include any one or any combination of more than one compound selected from a group consisting of isobornyl acrylate, isobornyl methacrylate, cyclohexyl acrylate, dicyclopentanyl acrylate, 2-norbonyl acrylate, and 2-norbornyl methacrylate.

The concentration of the (meth)acrylate component in the composition is 10 mass % or more and can be 20 mass % or more, 30 mass % or more, 40 mass % or more, 50 mass % or more, 60 mass % or more, 70 mass % or more, even 80 mass % or more while at the same time is typically 90 mass % or less, and can be 80 mass % or less, 70 mass % or less, 60 mass % or less, 50 mass % or less, 40 mass % or less, 30 mass % or less, even 20 mass % or less based on the combined mass of (a) organopolysiloxane resin, (b) (meth) acrylate component, and (c) crosslinker.

It is desirable for the composition of the present invention to be inkjet printable, meaning that it can be printed onto a substrate using inkjet printing devices. In order to be inkjet printable, the viscosity of the composition must be low enough to work in an inkjet device. To work in an inkjet device, the composition desirably has a viscosity in a range of at least 10 mPa*s at 25° C. while at the same time has a viscosity of 50 mPa*s or less at 60° C. A discovery as part of the invention is that in order to be inkjet printable the concentration of the organopolysiloxane resin should be in a range of 10 to 60 mass % of the composition mass and at the same time the concentration of the (meth)acrylate component should be in a range of 40 to 90 mass % of the composition mass.

The composition of the present invention further comprises a crosslinker. The crosslinker has an average of at least two ethylenically unsaturated double bonds per molecule. Desirably, at least one of the ethylenically unsaturated double bonds is part of a (meth)acryloyloxy group. The crosslinker can contain a blend of unsaturated double bonds that are part of a (meth)acryloyloxy group and unsaturated double bonds that are not part of a (meth)acryloyloxy group. Alternatively, all of the ethylenically unsaturated double bonds can be part of a (meth)acryloyloxy group. The crosslinker provides high temperature stability to the cured composition by crosslinking the composition.

Suitable crosslinkers include any one or any combination of more than one compound selected from a group consisting of 1,6-hexanediol diacrylate, 1,9-nonanediol diacrylate, 1,10-decanediol diacrylate, neopentyl glycol diacrylate, diethylene glycol diacrylate, triethylene glycol diacrylate, tetraethylene glycol diacrylate, polyethylene glycol diacrylate, 2-hydroxy 3-methacryl propyl acrylate, tripropylene glycol diacrylate, polypropylene glycol diacrylate, pentaerythritol triacrylate, ethoxylated trimethylolpropane triacrylate, trimethylolpropane triacrylate, propoxylated trimethylolpropane triacrylate, ethoxylated glycerin triacrylate, tris(2-acryloxyethyl) isocyanurate, caprolactone-modified tris(2-acryloxyethyl)isocyanurate, ethoxylated pentaerythritol tri- and tetra-acrylate, 2-(2-vinyloxylethoxy)ethyl acrylate 1-(2-vinyloxyethoxy)ethyl methacrylate, and ethoxylated allyl acrylate.

The concentration of the crosslinker component in the composition is 0.1 mass % or more and can be 0.5 mass % or more, 1.0 mass % or more, 2.0 mass % or more, 3.0 mass % or more, 4.0 mass % or more, 5.0 mass % or more, 6.0 mass % or more, 7.0 mass % or more, 8.0 mass % or more, even 9.0 mass % or more while at the same time is typically 11 mass % or less, and can be 10 mass % or less, 9.0 mass % or less, 8.0 mass % or less, 7.0 mass % or less, 6.0 mass % or less, 5.0 mass % or less, 4.0 mass % or less, 3.0 mass % or less, 2.0 mass % or less, even 1.0 mass % or less based on the combined mass of (a) organopolysiloxane resin, (b) (meth)acrylate component, and (c) crosslinker. If the concentration of the crosslinker is insufficient, the cured product does not have high temperature stability. If the concentration of the crosslinker is too high, the cured product is undesirably brittle.

For avoidance of doubt, the sum of the mass % for the combination of (a) organopolysiloxane resin, (b) (meth) acrylate component, and (c) crosslinker based on the combined mass of (a) organopolysiloxane resin, (b) (meth) acrylate component, and (c) crosslinker is 100 mass %.

The composition of the present invention further comprises a photoradical initiator. Suitable photoradical initiators include ultraviolet (UV) initiators such as any one or any combination of more than one of benzophenone and benzophenone derivatives, acetophenone and acetophenone derivatives, benzoin and its alkyl esters, phosphine oxide derivatives, xanthone derivatives, oxime ester derivatives, and camphor quinone. Suitable commercially available photoinitiator include any one or any combination of more than one selected from 2,6-bis(4-azido benzylidene)cyclohexanone; 2,6-bis(4-azido benzylidene)-4-methylcyclohexanone; 1-hydroxyl-cyclohexyl-phenyl-ketone (available under the name OMNIRAD™ 184); 2-methyl-1[4-(methylthio)phenyl]-2-morpholinopropane-1-one (available under the name OMNIRAD 907); 2-hydroxy-2methyl-1-phenyl-propane-1-one (available under the name OMNIRAD 1173); 2-hydroxy-1-[4-(2-hydroxyethoxy)phenyl]-2-methyl-1-propanone (available under the name OMNIRAD 2959); methylbenzoylformate (available under the name OMNIRAD MBF); alpha, alpha-dimethoxy-alpha penylacetophenone (available under the name OMNIRAD 651); 2-benzyl-2-(dimethylamino)-1-[4-(4-morpholinyl)phenyl]-1-butanone (available under the name OMNIRAD 369); diphenyl (2,4, 6-trimethylbenzoyl)phosphine oxide (available under the name OMNIRAD TPO); ethyl (2,4,6-trimethylbenzoyl) phenyl phosphinate (available under the name OMNIRAD TPO-L); oxime ester compounds (available as products N-1919, NCI-831, NCI-930, NCI-730 and NCI-100 from Adeka Corporation), 12-hioxanthene-9-one; 10-methylpehenothiazine; isopropyl-9H-thioxanthen-9-one; 2,4-diethyl-9H-thoxanthen-9-one; 2-chlorothioxanthen-9-one; and 1-chloro-4-propoxy-9H-thioxanthen-9-one. OMNIRAD is a trademark of IGM Group B.V.

The concentration of photoinitiator in the composition is typically 0.1 mass % or more, and can be 0.5 mass % or more, 1.0 mass % or more, 2.0 mass % or more, 3.0 mass % or more, 4.0 mass % or more, 5.0 mass % or more, 6.0 mass % or more, 7.0 mass % or more, 8.0 mass % or more, even 9.0 mass % or more while at the same time is typically 10 mass % or less, and can be 9.0 mass % or less, 8.0 mass % or less, 7.0 mass % or less, 6.0 mass % or less, 5.0 mass % or less, 4.0 mass % or less, 3.0 mass % or less, 2.0 mass % or less, even 1.0 mass % or less based on the combined mass of (a) organopolysiloxane resin, (b) (meth)acrylate component, and (c) crosslinker.

The composition of the present invention can optionally comprise any one or any combination of more than one additional component, or be free of any one or any combination or more than one additional component. For example, additional acrylate monomers having a silicon atom may be present in the composition. Examples of such acrylate monomers include 3-[dimethoxy(methyl)silyl]propyl acrylate, trimethylsilyl methacrylate, trimethylsilyl acrylate, triisopropyl silyl acrylate, 3-(methoxydimethylsilyl)propyl acrylate, (trimethoxysilyl)methyl methacrylate, 3-(trimethyloxylsilyl)propyl acrylate, 3-(trimethoxysilyl)propyl methacrylate, 3-[dimethoxy(methyl)silyl]propyl methacrylate, 3-(tris(trimethylsilyloxy)silyl]propyl methacrylate, and methacryloxypropyl(tris(trialkylsiloxy)silylethyl dimethylsiloxy)silane. The concentration of additional acrylate monomers is typically 10 mass % or less and can be 9 mass % or less, 8 mass % or less, 7 mass % or less, 6 mass % or less, 5 mass % or less, 4 mass % or less, 3 mass % or less, 2 mass % or less, 2 mass % or less, one mass % or less, 0.5 mass % or less, or even 0.1 mass % or less and can be zero mass % based on the combined mass of (a) organopolysiloxane resin, (b) (meth)acrylate component, and (c) crosslinker.

The composition can comprise or be free of radical scavengers. Radical scavengers can be desirable to extend the storage stability of the composition by inhibiting curing until intentionally exposing the composition to UV light. Radical scavengers include phenolic compounds such as any one or any combination of more than one of 4-methoxyphenol (MEHQ, methyl ether of hydroquinone), hydroquinone, 2-methylhydroquinone, 2-t-butyihydroquinone, t-butyl catechol, butylated hydroxy toluene, and butylated hydroxy anisole. Other types of radical scavengers include phenothiazine and anaerobic inhibitors such as NPAL type inhibitors (tris-(N-nitroso-N-phenylhydroxylamine) aluminum salt) available from Albemarle Corporation. Typically, free radical scavengers are present in the composition at a concentration of zero mass % or more, 0.001 mass % or more, 0.01 mass % or more, even 0.5 mass % or more while at the same time is typically present at a concentration of 1.0 mass % or less and can be present at a concentration of 0.5 mass % or less, even 0.1 mass % or less where mass % is based on based on the combined mass of (a) organopolysiloxane resin, (b) (meth)acrylate component, and (c) crosslinker.

The composition of the present invention can comprise or be free of plasticizers. Plasticizers are non-reactive components that lower the viscosity of the composition when added to the composition. Desirably, the composition is free of plasticizers.

The composition can comprise or be free of any one or any combination of more than one other additional additive including those selected form UV absorbers, antioxidants, sensitizer (for example, anthracene derivatives and acridine derivatives), and chain transfer agents. These other additional additives can be present at a combined concentration of zero mass % or more, 0.001 mass % or more, 0.01 mass % or more, even 0.5 mass % or more while at the same time is typically present at a concentration of 1.0 mass % or less and can be present at a concentration of 0.5 mass % or less, even 0.1 mass % or less where mass % is based on the combined mass of (a) organopolysiloxane resin, (b) (meth) acrylate component, and (c) crosslinker.

The present invention also includes a process for using the composition of the present invention. The composition of the present invention is useful as an adhesive material, desirably an inkjet printable and/or optically clear adhesive. In that regard, a process of the present invention for using the composition as an adhesive, where the process comprises the steps of applying the composition onto a first object and then applying a second object to the composition so as to sandwich the composition between and in contact with the first and second objects.

The composition of the present invention is UV curable. Desirably, the process of the present invention further comprises curing the composition between the first and second objects by exposing the composition to ultraviolet light.

It can be desirable to pre-cure the composition after applying to the first object and before applying the second object. Pre-curing is the partial curing of the composition by, for example, exposing the composition to UV light sufficient to partially cure the composition. Pre-curing can build composition viscosity, which can be desirable when the composition has low viscosity such as can be desirable for inkjet printing the composition but then a higher viscosity is desirable to prevent undesirably flow of the composition once applied to the first object. For example, a composition may require relatively low viscosity to readily flow during application to the first object, but the first object may require reorientation (such as turning upside down) in order to apply the second object and it can be undesirable for the composition to flow on the first object during reorientation. Pre-curing can build viscosity in the composition prior to reorientation to prevent flow during reorientation but leave the composition sufficiently non-cured have sufficient softness and conformability to tightly bond to the second object without voids. The extent of pre-curing is controllable by changing the UV light intensity and/or irradiation time used in pre-curing. Increasing either of these will increase the extent of pre-curing. If the extent of pre-curing is too low, the pre-cured composition is too easily deformed and can extrude out from between the first and second object when pressed between the first and second object. If the extent of pre-curing is too high, then the composition is insufficiently deformable to conform to the first and second object and results in voids between the composition and at least one of the objects. If the pre-curing is too high the composition can also suffer from poor adhesion to one or both substrate.

Desirably, pre-curing results in an extent of curing in the composition that is 50% or more, and can be 70% or more, 75% or more, 80% or more, even 90% or more while at the same time is 100% or less, and can be 90% or less, 80% or less, 70% or less, even 60% or less.

Determine extent of curing using Fourier transform infrared (FTIR) spectroscopy by monitoring the absorption peak intensity of unsaturated double bonds (C=C) that appear at 809 or 1408 wavenumbers ($cm^{-1}$) in the infrared spectrum of the composition. Preferably, use the 809 $cm^{-1}$ peak but if that one is too difficult to resolve then use the 1408 $cm^{-1}$ peak. The peak intensities at these positions reduce with extent of curing because curing involves reacting the unsaturated double bonds and thereby consuming them. Calculate extent of curing with the following equation:

$$\text{Extent of Curing (\%)} = 100\% \left[ (Ao - Ai) / Ao \right]$$

where:
Ai=absorption peak intensity of unsaturated double bonds in the composition after UV irradiation; and
Ao=absorption peak intensity of unsaturated double bonds in the composition before UV irradiation.

In the broadest scope of the process of the present invention, the composition application of the composition to the first object can occur by any means. For example, the following devices are suitable for applying the composition onto the first object: gravure coater, offset coater, offset gravure coater, roller coater, reverse-roller coater and printing processes such as screen printing, pin transfer, stencil printing and inkjet printing. Desirably, inkjet print the composition onto the first component in a desirable pattern using an inkjet printer.

The first object and/or second object can transmit optical light, and can be optically transparent. Desirably, at least one of the first and second objects transmit UV light and curing of the composition after applying the second object occurs by exposing the composition to UV light through at least one of the first and second objects.

Desirably, conduct UV pre-curing and curing of the composition using any one or combination of more than one wavelength selected from 365 nanometers (nm), 385 nm, 395 nm and 405 nm. For optimal control of the UV exposure it is beneficial to use a UV light emitting diode (LED) lamp. Generally, UV light exposure dosage is in a range of 0.1 Joules per square centimeter ($J/cm^2$) or more, and can be 1.0 $J/cm^2$ or more while at the same time is typically 200 $J/cm^2$ or less, and can be 100 $J/cm^2$ or less. UV exposure of the composition to cure the composition can occur in air. However, oxygen can inhibit curing so UV exposure can preferentially occur in an atmosphere free of oxygen such as in nitrogen or carbon dioxide.

EXAMPLES

Table 1 lists the components for preparing the Examples (Exs) and Comparative Examples (C Exs) in this section. "Ph" refers to phenyl, "Me" refers to methyl, "Pr" refers to n-propyl, and "Ma" refers to methacryloyloxypropyl. "a/c", "b/c", and "a/d" ratios refer to ratios of the subscripts with those letters as used in Formula (I).

TABLE 1

| Component | Description | Source |
|---|---|---|
| A-1 | $T^{Ph}_{70}T^{Pr}_{30}$ having an OZ content of 5.0 mass % OH based on the organopolysiloxane resin mass (36 mol % relative to moles resin), an average Mw of 2,900 g/mol and a molar ratio of alkyl:aryl groups of 0.43:1. | Available as DOWSIL ™ RSN-6018 Resin Intermediate from The Dow Chemical Company. |
| A-2 | $D^{Ph,Me}_{0.05}D^{Ph,Ph}_{0.10}T^{Me}_{0.45}T^{Ph}_{0.40}$ having an OZ content of 7.1 mass % OH based on the organopolysiloxane resin mass (46 mol % relative to moles resin), an average Mw of 2,500 g/mol, the molar ratio of alkyl: aryl groups is 0.77:1, and the b/c ratio is 0.2. | Available as DOWSIL ™ RSN-0233 Flake Resin from The Dow Chemical Company. |

TABLE 1-continued

| Component | Description | Source |
|---|---|---|
| A-3 | $D^{Me,Me}_{0.15}T^{Me}_{0.40}T^{Ph}_{0.45}$ having an OZ content of 6.5 mass % OH based on the organopolysiloxane resin mass (38 mol % relative to moles resin), an average Mw of 3,055 g/mol, a molar ratio of alkyl:aryl groups of 1.6:1, and the b/c ratio is 0.2. | Available as DOWSIL ™ RSN-0249 Flake resin from The Dow Chemical Company. |
| A-4 | $T^{Ph}_{1.00}$ having an OZ content of 8.5 mass % OH based on the organopolysiloxane resin mass (70 mol % relative to moles resin), an average Mw of 2,660 g/mol and a molar ratio of alkyl:aryl groups of 0:1. | Available as DOWSIL ™ RSN-0217 Flake Resin from The Dow Chemical Company. |
| A-5 | $D^{Me,Me}_{0.15}D^{Ph,Ph}_{0.05}T^{Me}_{0.10}T^{Ph}_{0.70}$ having an OZ content of 6.0 mass % OH based on the organopolysiloxane resin mass (49 mol % relative to moles resin), an average Mw of 3,294 g/mol, a molar ratio of alkyl:aryl groups of 0.5:1, and the b/c ratio is 0.3. | Available as DOWSIL ™ RSN-0220 Flake Resin from The Dow Chemical Company. |
| A-6 | $M^{Me,Me,Me}_{0.28}T^{Pr}_{0.25}T^{Ph}_{0.48}$ having an OZ content of 0.0 mass % based on organopolysiloxane resin mass, an average Mw of 3,719 /mol, a molar ratio of alkyl:aryl groups of 2.3:1, and the a/c ratio a/c is 0.4. | Prepare as described herein below. |
| A-7 | $T^{Ph}_{0.65}Q_{0.35}$ having an OZ content of 7.4 mass % OH based on the organopolysiloxane resin mass (38 mol % relative to moles resin), an average Mw of 1,614 g/mol, 0:1 alkyl:aryl group mole ratio, and the d/c ratio is 0.5. | Prepare as described herein below. |
| A-8 | $M^{Me,Me,Me}_{0.12}T^{Ph}_{0.53}Q_{0.35}$ having an OZ content of 5.2 mass % OH based on the organopolysiloxane resin mass (24 mol % relative to mole resin), an average Mw of 3,277 g/mol, a molar ratio of alkyl:aryl groups of 0.68:1, the a/c ratio is 0.2, and the d/c ratio is 0.7. | Prepare as described herein below. |
| A'-9 | Trimethylsiloxysilicate; $M^{Me,Me,Me}_{43}Q_{57}$ having an OZ content of 3.1 mass % OH based on the organopolysiloxane resin mass (6 mol % relative to moles of resin) and average Mw of 16,500 g/mol. Molar ratio of alkyl: aryl groups is 1:0. | Available as DOWSIL ™ MQ-1600 Solid Resin from The Dow Chemical Company. |
| A'-10 | $T^{Ph}_{0.75}T^{Ma}_{0.25}$ having an OZ content of 5.5 mass % OH based on the organopolysiloxane resin mass (47.5 mol % relative to moles resin), an average Mw of 10,203 g/mol, and a molar ratio of alkyl: aryl groups is 0:1. | Prepare as described herein below. |
| A'-11 | $M^{Me,Me,Me}_{0.64}T^{Ph}_{0.36}$, having an OZ content of 0.0 mass % relative to organopolysiloxane resin mass, and an average Mw of 670 g/mol. Alkyl: aryl group mole ratio is 5.3:1. | Available as DOWSIL ™ 556 Cosmetic Grade Fluid from The Dow Chemical Company. |
| A'-12 | $M^{Me,Me,OH}_{0.33}D^{Ph,Me}_{0.67}$ having an OZ content of 4.7 mass % OH based on the organopolysiloxane resin mass (33 mol % relative to mole resin), an average Mw of 710 g/mol. Molar ratio of alkyl: aryl groups is 2:1. | Available as DOWSIL ™ 4-2828 Intermediate from The Dow Chemical Company. |
| B(i)-a1 | 2-(2-ethoxyethoxy)ethyl acrylate | Available as A007 from Green Chemical Co., Ltd. |
| B(i)-b1 | Hydroxypropyl acrylate | Available as HPA from Osaka Organic Chemical Industry, Ltd. |
| B(i)-a2 | Methoxy polyethylene glycol 400 acrylate (Mw 454) | Available as MA-90G from Shin Nakamura Chemical Co., Ltd. |
| B(i)-a3 | Phenol ethylene glycol acrylate | Tokyo Chemical Industry Co., Ltd. |
| B(ii)-1 | 2-ethylhexyl acrylate | Sigma Aldrich |
| B(ii)-2 | Isononyl acrylate | Available as INAA from Osaka Organic Chemical Industry, Ltd. |
| B(ii)-3 | Octyl acrylate | Available as NOAA from Osaka Organic Chemical Industry, Ltd. |
| B(ii)-4 | Isostearyl acrylate | Available as ISTA from Osaka Organic Chemical Industry, Ltd. |
| B(ii)-5 | Isobornyl acrylate | Tokyo Chemical Industry Co., Ltd. |
| C-1 | 1,9-nonanediol diacrylate | Available as D007 from Green Chemical Co., Ltd. |
| C-2 | Pentaerythritol triacrylate | Available as T001 from Green Chemical Co., Ltd. |

TABLE 1-continued

| Component | Description | Source |
|---|---|---|
| C-3 | Pentaerythritol tetraacrylate | Available as M004 from Green Chemical Co., Ltd. |
| C-4 | 2-propenoic acid, 2-[2-(ethenyloxy)ethoxy]ethyl ester | Available from Nippon Shokubai as VEEA. |
| C-5 | Ethoxylated allyl acrylate | Available as A2013 from Green Chemical Co., Ltd. |
| C-6 | Tripropylene glycol diacrylate | Available as D031 from Green Chemical Co., Ltd. |
| D-1 | Ethyl (2, 4, 6-trimethylbenzoyl)-phenyl-phosphinate | OMNIRAD ™ TPO-L from IGM Resins |
| D-2 | 2-hdyroxy-2-methyl-1-phenylpropan-1-one | OMNIRAD ™ 1173 from IGM Resins |
| TSPM | 3-[tris(trimethylsiloxy)silyl]propyl methacrylate | Sigma Aldrich |

DOWSIL is a trademark of The Dow Chemical Company. OMNIRAD is a trademark of IGM Group B.V. Besloten Vennootschap.

Preparation of A-6

Equip a 500 milliliter (mL) three-necked flask with a thermometer, a dean-stark trap, and a reflux condenser. Add to the flask 158.02 g of A-1 and dissolve in 80.02 g toluene. Once dissolved, add 54.01 g hexamethyldisilazane (Sigma-Aldrich) and 0.12 g trifluoroacetic acid (Sigma-Aldrich) slowly into the flask. Stir the resulting mixture for one hour at 40 degrees Celsius (° C.). Add 25.65 g of water to the mixture and raise the temperature slowly to reflux for 2 hours. Remove water and by-products by azeotropic distillation through the dean-stark trap. Cool the solution down to 25° C. Filter and remove toluene under reduced pressure to obtain A-6.

Preparation of A-7

Equip a 200 mL four-necked flask with a mechanical stirrer, thermometer, dropping funnel and reflux condenser. Add 24.17 g of trimethoxyphenylsilane (Sigma-Aldrich) and 13.67 g tetraethyl orthosilicate (Sigma-Aldrich). While stirring the mixture in the flask slowly add 1.66 g of concentrated hydrochloric acid and 12.15 g water. Stir for 2 hours and then add 25 g of toluene. Treat the resulting mixture with 25 g toluene and 50 g of water and transfer to a separatory funnel. Collect and combine the bottom and top of the resulting three layers and wash with 50 g of water. Again collect the top and bottom of the resulting 3 layers and repeat the water wash three times. Isolate the organic layer and dry over anhydrous sodium sulfate and then filter to obtain 21% A-7 in solution.

Preparation of A'-8

Equip a 200 mL four-necked flask with a mechanical stirrer, thermometer, dropping funnel and reflux condenser. Add 1.98 g of hexamethyldisiloxane (Sigma-Aldrich), 21.35 g trimethoxyphenylsilane (Sigma-Aldrich), and 14.81 g tetraethyl orthosilicate (Sigma-Aldrich). While stirring the mixture in the flask slowly add 1.66 g of concentrated hydrochloric acid and 11.85 g water. Stir for 2 hours and then add 25 g of toluene. Treat the resulting mixture with 25 g toluene and 50 g of water and transfer to a separatory funnel. Collect and combine the bottom and top of the resulting three layers and wash with 50 g of water. Again collect the top and bottom of the resulting 3 layers and repeat the water wash three times. Isolate the organic layer and dry over anhydrous sodium sulfate and then filter to obtain 23% A'-8 in solution.

Preparation of A'-10

Equip a 200 mL four-necked flask with a mechanical stirrer, thermometer, dropping funnel and reflux condenser. Add 26.97 g trimethoxyphenylsilane (Sigma-Aldrich), and 11.26 g OFS-6030. While stirring the mixture in the flask slowly add 1.66 g of concentrated hydrochloric acid and 11.75 g water. Stir for 2 hours and then add 25 g of toluene. Treat the resulting mixture with 25 g toluene and 50 g of water and transfer to a separatory funnel. Collect and combine the bottom and top of the resulting three layers and wash with 50 g of water. Again collect the top and bottom of the resulting 3 layers and repeat the water wash three times. Isolate the organic layer and dry over anhydrous sodium sulfate and then filter to obtain 42% A'-10 in solution.

Sample Compositions

Tables 2-4 list the compositions of the Example (Ex) and Comparative Example (C Ex) composition samples with component amounts listed in grams. Tables 5 and 6 list characterizations of the compositions, including cured forms of the compositions.

For C Exs A to K, mix components (B), (C) and (D) with an agitator for one minute at 23° C. For example, prepare C Ex A by combining 99 g of the component [B(i)-a1], one g of the component (C-1), and 0.5 g of the component (D-1) and then mixing them together with an agitator for one minute at 23° C.

For C Exs L to T, Exs 1 to 27, and Ex 31, dissolve the A component (A-1, A-2, A-3, A-4, A-5, A-6, A'-9, A'-11, or A'-12) in the (B) component(s). Then, add to the resulting solution component (C) and (D) and mix. For example, prepare Ex. 1 by dissolving 50.2 g of Component (A-1) in 5.6 g of Component [B(i)-a1] and 43.2 g of Component [B(ii)-1] while agitating at 23° C. for 24 hours. Then, add 1.0 g of Component (C-1) and 0.5 g of the Component (D-1) to the solution and mix with an agitator for one hour at 23° C.

For C Exs U to V, and Exs 28 to 29, dissolve the A component that is already a solution in organic solvent (A-7, A-8, or A'-10) in component (B). Then, remove organic solvent under reduced pressure at 40-80° C. Cool to 23° C. and add Components (C) and (D) to the solution and mix. For example, to prepare Ex 28, combine 313.3 g of 21% A-7 solution (65.8 g of A-7) and 33.2 g of [1B(i)-a2] in a 1 liter flask. Then, remove organic solvent by the rotary evaporator (at 50° C., <1 torr for 6 hours) under nitrogen bubbling. Cool to 23° C. and then add 1.0 g of Component (C-6), 1 g of the Component (D-1) to the above mixture and mixed with an agitator for one hour at 23° C.

Characterize each of the samples using the following characterizations:

Viscosity

Determine the viscosity (dynamic viscosity) of each sample using an AR-G2 Rheometer with a 40 millimeters diameter 2-degree cone and plate measuring system. Use a shear rate of 10 s$^{-1}$ for one minute at 25° C. and 60° C. Control the sample temperature with a Peltier plate.

Shear Storage Modulus

Cure a test sample of each sample composition for testing shear storage modulus. Pour a sample composition into a mold (1 millimeter (mm) thick by 50 mm wide by 50 mm long) and sandwich between fluoro-coated polyethylene terephthalate film. Cure the sample compositions in the mold by exposing it to 365 nm wavelength LED light (FireJet™ FJ100 lamp; FireJet is a trademark of Phoseon Technology, Inc.) with a total UV dosage of 6 J/cm$^2$. After curing the sample composition remove the fluoro-coated polyethylene terephthalate film and mount the cured sample onto a parallel-plate geometry (25 millimeter) of a rheometer (AtonParr MCR-502). Collect the shear storage modulus (G') at a fixed frequency of 1 Hertz with a strain of 1.0% and a normal force of 0.5 Newton at 25° C. and 80° C. Report G' in units of kiloPascals (kPa).

Transmittance

Pour a sample composition into a mold (one mm thick by 50 mm wide by 50 mm long) and sandwiched between microslide glasses (Matsunami Glass Co., Ltd product #9213). Cure the sandwiched sample composition mold by exposing it to 365 nm wavelength LED light (FireJet™ FJ100 lamp; FireJet is a trademark of Phoseon Technology, Inc.) with a total UV dosage of 6 J/cm$^2$. Measure the transmittance of 550 nm wavelength through the cured sample composition according to ASTM method D 1003 (use UV-Visible Spectrophotometer, Konica Minolta CM-3600A, Reference material is deionized water). Reference transmittance through the cured sample material to transmittance through deionized water to determine % T.

Peel Adhesion Strength

Coat a sample composition onto a glass plate to form a 40 micrometer film (100 mm wide and 150 mm long) and pre-cure the film by exposure to 1.5 J/cm$^2$ of 365 nm light from an LED lamp (FireJet FT100). Place a corona-treated polyethylene terephthalate film on the pre-cured film and bond to the pre-cured film by moving a rubber-lines pressure roller of 2 kilograms mass on the film twice back and forth. Fully cure the resulting laminate by irradiating with 365 nm light from the LED lamp again with an exposure of 5 J/cm$^2$. Allow the cured laminate to age for one day at 25° C. Slice through the PET layer to form 2.54 centimeter wide strips of PET film on the cured composition film. Using a Texture analyzer peal the PET film from the cured composition film by pulling along the PET film strip length at a speed of 5.0 mm/second at an angle of 180° relative to the PET film's original orientation. Report adhesion strength in units of Newtons per meter (N/m).

Shrinkage

Determine the specific gravity of a sample composition (SGL) at 25° C. using a gravity cup method. Pour the sample composition into a mold (10 millimeter thickness, 20 mm wide and 40 mm long) and sandwich between fluoro-coated polyethylene terephthalate film. Cure the sample composition by exposing it to 365 nm wavelength LED light (FireJet™ FJ100 lamp; FireJet is a trademark of Phoseon Technology, Inc.) with a total UV dosage of 6 J/cm$^2$. Remove the fluoro-coated polyethylene terephthalate film and measure the specific gravity of the cured film (SGs) according to test method JIS K7112 B.

Determine total shrinkage of the composition after cure as a percentage relative to precured sample with the following calculation:

$$\% \text{ Shrinkage} = 100\% \times [(SG_S) - (SG_L)] / (SG_L)$$

Results

Examples (Exs) 1-29 are examples of photocurable silicone acrylate compositions of the present invention that provide a flowable liquid prior to curing that has a viscosity of 14 to 27,000 milliPascals*seconds (mPa*s) at 25 C and 2 to 4453 mPas*s at 60° C. Upon curing the compositions using ultraviolet (UV) light, the compositions are optically clear (% T greater than 90% at 1 millimeter thickness) and have a shear storage modulus (G') of greater than one kPa and less 1157 kPa at 25° C. as well as greater than one kPa and less than 500 kPa at 80° C., a peel adhesion strength in a range of 65 Newtons per meter (N/m) to 1160 N/m (170-3000 grams force per inch), and shrinkage of less than 8%. Of particular importance are those samples (Exs 1-3, 5-20,22,23,25-27, 30 and 31) that have a viscosity of at least 10 mPa*s at 25° C. while at the same time having a viscosity of 50 mPa*s or less at 60° C. because those are suitable for applying by inkjet methods.

Comparative Examples (C Exs) A, C, D, G, and I illustrate that photocurable silicone compositions containing all the components of the presently claimed composition except for the organopolysiloxane resin result in both an undesirable adhesion strength and shrinkage.

C Exs B and F illustrate that photocurable silicone compositions containing all the components of the presently claimed composition except for the organopolysiloxane resin result in an undesirable shrinkage.

C Exs E, H, J and K illustrate that photocurable silicone compositions containing all the components of the presently claimed composition except for the organopolysiloxane resin result in an undesirable adhesion strength.

C Exs L and S illustrate that photocurable silicone compositions containing all of the components of the presently claimed invention except for the monofunctional (meth) acrylate that contains an ether group and/or a hydroxyl group fails to achieve optical clarity.

C Exs M-R illustrate that photocurable silicone compositions containing all of the components of the presently claimed invention when the molar ratio b(ii)/b(i) is above 25 fails to achieve optical clarity (the transmittance below 90%).

C Ex T illustrates that photocurable compositions that use a MQ resin for the organopolysiloxane resin result and cured samples having poor transmittance that are not optically clear.

C Exs U and V illustrate that a photocurable composition that uses an organopolysiloxane resin with at least 50 mol % R$^1$SiO$_{3/2}$ units where R$^1$ is selected from alkyl and aryl groups, and that contains methacryloyloxypropyl functional T units, results in a cured sample without adhesion strength. Without being bound by theory, one possibility is that the resin cures too hard with too high of a shear storage modulus to have sufficient tackiness for adequate adhesion strength because the (meth)acryl functional silicone resins increases crosslinking density. Therefore, it is important to use alkyl and aryl groups (which by definition are non-functional in these crosslinking reactions) as the $R^1$ groups of the $R^1SiO_{3/2}$ units of the organopolysiloxane resin.

C Exs W and X illustrate that a photocurable composition that uses an organopolysiloxane resin less than 50 mol % $R^1SiO_{3/2}$ units where $R^1$ is selected from alkyl and aryl groups, and uses that has a Mw less than 1000 g/mol, results in a cured sample without desirable adhesion strength.

Ex 1 illustrates, particularly relative to C Ex L, that including the claimed organopolysiloxane resin component in the composition of C Ex A results in a composition that cures to an optically clear material, desirable adhesion strength and shrinkage while having desirable viscosity prior to curing. Comparing Exs 1 and 7 to C Exs L and S illustrates the importance of the monofunctional acrylates contain ether and/or hydroxy groups to obtain optical clarity. Comparing Es 1, 2 and 7-11 to C Exs M-R illustrates that a composition of the present invention can achieve a transmittance above 90% at 550 nm while also having a molar ratio of b(ii):b(i) within a range of 0:1 to 18:1. It is expected that a molar ratio of b(ii):b(i) in a range of 0:1 to 22:1 can produce an optically clear material.

Examples 3, 4, 14, 24, 25, and 28-30 particularly illustrate that a composition of the present invention can cure to an optically clear material with desirably adhesion force even without a monofunctional (meth)acrylate containing alkyl groups and that is free of ether and hydroxyl groups.

Exs 3 and 4, as well as Exs 9 and 11, illustrate that increasing the concentration of the organopolysiloxane resin tends to increase the adhesion strength of the resulting curing composition.

Exs 20-30 illustrate that the photocurable silicone acrylate composition of the present invention cure to optically clear materials with desirable properties with a variety of different organopolysiloxane resin components, provided that the amount of $R^1SiO_{3/2}$ units is at least 50 mol % of the siloxane units and where each $R^1$ is selected from alkyl and aryl groups. While the organopolysiloxane resin can comprise M, D and Q siloxane units, the amount of $R^1SiO_{3/2}$ units where $R^1$ is selected from alkyl and aryl groups must be at least 50 mol % of the siloxane units.

The particular choice of organopolysiloxane resin also appears to reduce the shrinkage of a curable composition upon curing.

Notably, none of the Exs include a plasticizer.

TABLE 2

| | C Ex A | C Ex B | C Ex C | C Ex D | C Ex E | C Ex F | C Ex G | C Ex H | C Ex I | C Ex J | C Ex K |
|---|---|---|---|---|---|---|---|---|---|---|---|
| A-1 | | | | 32.8 | | | | | | | |
| A-2 | | | | | | | | | | | |
| A-6 | | | | | | | | | | | |
| A'-9 | | | | | | | | | | | |
| B(i)-a1 | 99.0 | | | | | | | | | | |
| B(i)-b1 | | 99.0 | 11.1 | 22.1 | | | | | | | |
| B(i)-a2 | | | | | 99.0 | | | | | | |
| B(i)-a3 | | | | | | 99.0 | | | | | |
| B(ii)-1 | | | 87.9 | 75.9 | | | 99.0 | | | | |
| B(ii)-2 | | | | | | | | 99.0 | | | |
| B(ii)-3 | | | | | | | | | 99.0 | | |
| B(ii)-4 | | | | | | | | | | 99.0 | |
| B(ii)-5 | | | | | | | | | | | 99.0 |
| C-1 | 1.0 | 1.0 | 1.0 | 1.0 | 1.0 | 1.0 | 1.0 | 1.0 | 1.0 | 1.0 | 1.0 |
| D-1 | 0.5 | 0.5 | 0.5 | 0.5 | 0.5 | 0.5 | 0.5 | 0.5 | 0.5 | 0.5 | 0.5 |

| | C Ex L | C Ex M | C Ex N | C Ex O | C Ex P | C Ex Q | C Ex R | C Ex S | C Ex T |
|---|---|---|---|---|---|---|---|---|---|
| A-1 | 32.8 | 50.2 | 50.2 | 50.2 | 32.8 | 32.8 | 32.8 | | |
| A-2 | | 0.5 | 1.0 | | | | | | |
| A-6 | | | | | | | | 33.0 | |
| A'-9 | | | | | | | | | 33.2 |
| B(i)-a1 | | | | 1.9 | | | | | |
| B(i)-b1 | | | | | 0.5 | 0.8 | 1.0 | | 11.1 |
| B(i)-a2 | | | | | | | | | |
| B(i)-a3 | | | | | | | | | |
| B(ii)-1 | | | | 46.9 | 65.7 | 65.3 | 65.2 | | 54.8 |
| B(ii)-2 | 66.2 | 48.2 | 47.7 | | | | | 66.0 | |
| B(ii)-3 | | | | | | | | | |
| B(ii)-4 | | | | | | | | | |
| B(ii)-5 | | | | | | | | | |
| C-1 | 1.0 | 1.0 | 1.0 | 1.0 | 1.0 | 1.0 | 1.0 | 1.0 | 1.0 |
| D-1 | 0.5 | 0.5 | 0.5 | 0.5 | 1.0 | 1.0 | 1.0 | 0.5 | 0.5 |

TABLE 3

| | C Ex U | C Ex V | C Ex W | C Ex X | C Ex Y | C Ex Z | Ex 1 | Ex 2 | Ex 3 | Ex 4 | Ex 5 |
|---|---|---|---|---|---|---|---|---|---|---|---|
| A-1 | | | | | | | 50.2 | 50.2 | 45.5 | 64.4 | 35.1 |
| A'-10 | 65.8 | 22.6 | | | | | | | | | |
| A'-11 | | | 33.7 | 33.7 | | | | | | | |

TABLE 3-continued

| | | | | | | | | | | |
|---|---|---|---|---|---|---|---|---|---|---|
| A'-12 | | | | | 33.7 | 33.7 | | | | |
| B(i)-a1 | | 7.4 | 10.9 | | 10.9 | | 5.6 | 11.1 | 53.5 | 34.6 | 43.9 |
| B(i)-b1 | | | | 10.9 | | 10.9 | | | | | |
| B(i)-a2 | 33.2 | 9.7 | | | | | | | | | |
| B(ii)-1 | | | | | | | 43.2 | 37.7 | | | |
| B(ii)-2 | | 58.4 | | | | | | | | | |
| B(ii)-3 | | | 54.5 | 54.5 | 54.5 | 54.5 | | | | | |
| B(ii)-4 | | | | | | | | | | | 30.0 |
| B(ii)-5 | | | | | | | | | | | |
| C-1 | | 1.0 | 1.0 | 1.0 | 1.0 | 1.0 | 1.0 | 1.0 | 1.0 | 1.0 | 1.0 |
| C-6 | 1.0 | 1.0 | | | | 1.0 | | | | | |
| D-1 | 1.0 | 1.0 | 1.0 | 1.0 | 1.0 | 1.0 | 1.0 | 1.0 | 1.0 | 1.0 | |

| | Ex 6 | Ex 7 | Ex 8 | Ex 9 | Ex 10 | Ex 11 | Ex 12 | Ex 13 | Ex 14 |
|---|---|---|---|---|---|---|---|---|---|
| A-1 | 35.1 | 32.8 | 32.8 | 32.8 | 32.8 | 50.7 | 33.2 | 39.0 | 33.2 |
| A'-10 | | | | | | | | | |
| A'-11 | | | | | | | | | |
| A'-12 | | | | | | | | | |
| B(i)-a1 | 43.9 | | | | | | | | 54.8 |
| B(i)-b1 | | 2.5 | 5.0 | 11.1 | 22.1 | 11.1 | 11.1 | 15.0 | 11.1 |
| B(i)-a2 | | | | | | | | | |
| B(ii)-1 | | 63. | 61.1 | 55.1 | 44.1 | 37.3 | | | |
| B(ii)-2 | | | | | | | 54.8 | | |
| B(ii)-3 | | | | | | | | 45.0 | |
| B(ii)-4 | | | | | | | | | |
| B(ii)-5 | 20.0 | | | | | | | | |
| C-1 | 1.0 | 1.0 | 1.0 | 1.0 | 1.0 | 1.0 | 1.0 | 1.0 | 1.0 |
| C-6 | | | | | | | | | |
| D-1 | 1.0 | 1.0 | 0.5 | 0.5 | 0.5 | 0.5 | 0.5 | 1.0 | 0.5 |

TABLE 4

| | Ex 15 | Ex 16 | Ex 17 | Ex 18 | Ex 19 | Ex 20 | Ex 21 | Ex 22 | Ex 23 | Ex 24 | Ex 25 | Ex 26 | Ex 27 | Ex 28 | Ex 29 | Ex 30 | Ex 31 |
|---|---|---|---|---|---|---|---|---|---|---|---|---|---|---|---|---|---|
| A-1 | 40.3 | 33.2 | 33.2 | 33.2 | 33.2 | | | | | | | | | | | | 34.2 |
| A-2 | | | | | | 33.2 | 63.7 | | | | | | | | | | |
| A-3 | | | | | | | | 33.2 | | | | | | | | | |
| A-4 | | | | | | | | | 33.2 | 63.7 | 47.5 | | | | | | |
| A-5 | | | | | | | | | | | | 33.2 | | | | | |
| A-6 | | | | | | | | | | | | | 33.5 | | | | |
| A-7 | | | | | | | | | | | | | | 65.8 | | | |
| A-8 | | | | | | | | | | | | | | | 65.8 | 48.3 | |
| A'-9 | | | | | | | | | | | | | | | | | |
| A'-10 | | | | | | | | | | | | | | | | | |
| B(i)-al | 21.7 | | | | | | | | | | | | | | | | |
| B(i)-b1 | 12.0 | 11.1 | 11.1 | 11.1 | 11.1 | 11.1 | | 11.1 | 11.1 | | | 11.1 | | | | | 11.4 |
| B(i)-a2 | | | | | | | 34.3 | | | 34.3 | 25.6 | | | 33.2 | 33.2 | 20.7 | |
| B(i)-a3 | | | | | | | | | | | 25.0 | | 40.0 | | | 30.0 | |
| B(ii)-1 | | 45.7 | 54.8 | 54.8 | 53.8 | 54.8 | | 54.8 | 54.8 | | | 54.8 | | | | | 53.4 |
| B(ii)-2 | | | | | | | | | | | | | 25.5 | | | | |
| B(ii)-3 | | | | | | | | | | | | | | | | | |
| B(ii)-4 | 25.0 | | | | | | | | | | | | | | | | |
| B(ii)-5 | | | | | | | | | | | | | | | | | |
| C-1 | 1.0 | 10.1 | | | | 1.0 | | 1.0 | 1.0 | | | 1.0 | 1.0 | | | | 1.0 |
| C-2 | | | 1.0 | | | | | | | | | | | | | | |
| C-3 | | | | 1.0 | | | | | | | | | | | | | |
| C-4 | | | | | 2.0 | | | | | | | | | | | | |
| C-5 | | | | | | | 2.0 | | | 2.0 | 2.0 | | | | | | |
| C-6 | | | | | | | | | | | | | | 1.0 | 1.0 | 1.0 | |
| D-1 | 1.0 | 0.5 | 0.5 | 0.5 | 0.5 | 0.5 | 2.0 | 0.5 | 0.5 | 2.0 | 2.0 | 0.5 | 0.5 | 1.0 | 1.0 | 1.0 | 0.52 |
| D-2 | | | | | | | 0.5 | | | 0.5 | 0.5 | | | | | | |
| TSPM | | | | | | | | | | | | | | | | | 3.1 |

TABLE 5

| Sample | Mole Ratio b(ii):b(i) | Viscosity (mPa*s) 25° C. | 60° C. | % T | Shear Storage Modulus (kPa) 25° C. | 80° C. | Adhesion Strength (N/m) | $SG_L$ | $SG_S$ | % Shrinkage |
|---|---|---|---|---|---|---|---|---|---|---|
| C Ex A | 0:1 | 3 | NM* | 100 | 30.4 | 37.1 | 2.9 | 1.010 | 1.097 | 8.6% |
| C Ex B | 0:1 | 4 | NM* | 100 | 448.1 | 79.0 | 391.5 | 1.058 | 1.212 | 14.5% |
| C Ex C | 5.6:1 | 2 | NM* | 100 | 18.4 | 20.5 | 0.8 | 0.894 | 0.978 | 9.4% |
| C Ex D | 2.5:1 | 2 | NM* | 100 | 40.4 | 42.5 | 1.2 | 0.911 | 1.001 | 9.9% |
| C Ex E | 0:1 | 24 | NM* | 100 | 9.4 | 11.3 | 1.7 | 1.089 | 1.127 | 3.4% |
| C Ex F | 0:1 | 9 | NM* | 99 | 108.1 | 52.7 | 38.1 | 1.093 | 1.195 | 9.3% |
| C Ex G | 0.5:0 | 5 | NM* | 102 | 10.2 | 12.7 | 6.9 | 0.876 | 0.955 | 9.0% |
| C Ex H | 0.5:0 | 2 | NM* | 99 | 23.5 | 26.1 | 0.2 | 0.881 | 0.956 | 8.5% |
| C Ex I | 0.5:0 | 2 | NM* | 99 | 19.6 | 21.5 | 0.0 | 0.871 | 0.945 | 8.4% |
| C Ex J | 0.3:0 | 17 | NM* | 99 | 177.9 | 44.0 | 1.2 | 0.866 | 0.913 | 5.4% |
| C Ex K | 0.5:0 | 8 | NM* | 99 | $5.0 \times 10^4$ | $9.5 \times 10^4$ | 0.2 | 0.980 | 1.054 | 7.5% |
| C Ex L | 0.4:0 | 13 | NM* | 57 | NM* | NM* | NM* | NM* | NM* | NM* |
| C Ex M | 93.2:1 | 67 | NM* | 71 | NM* | NM* | NM* | NM* | NM* | NM* |
| C Ex N | 48.3:1 | 66 | NM* | 75 | NM* | NM* | NM* | NM* | NM* | NM* |
| C Ex O | 25.9:1 | 65 | NM* | 87 | NM* | NM* | NM* | NM* | NM* | NM* |
| C Ex P | 102:1 | 12 | NM* | 57 | NM* | NM* | NM* | NM* | NM* | NM* |
| C Ex Q | 55.4:1 | 13 | NM* | 62 | NM* | NM* | NM* | NM* | NM* | NM* |
| C Ex R | 46:1 | 13 | NM* | 64 | NM* | NM* | NM* | NM* | NM* | NM* |
| C Ex S | 0.3:0 | 16 | NM* | 51 | NM* | NM* | NM* | NM* | NM* | NM* |
| C Ex T | 3.5:1 | 9 | NM* | 76 | NM* | NM* | NM* | NM* | NM* | NM* |
| C Ex U | 0:1 | 7792 | 1299 | 100 | $2.0 \times 10^5$ | $7.5 \times 10^4$ | 0.0 | 1.145 | 1.250 | 9.2% |
| C Ex V | 4.9:1 | 16 | 7 | 100 | 157.6 | 130.8 | 0.0 | 0.978 | 1.054 | 7.8% |
| C Ex W | 5.1:1 | 4 | 2 | 100 | 63.8 | 67.0 | 0.8 | 0.938 | 0.980 | 4.5% |
| C Ex X | 3.5:1 | 3 | 3 | 100 | 9.5 | 10.5 | 3.1 | 0.928 | 0.983 | 5.9% |
| C Ex Y | 5.1:1 | 8 | 3 | 100 | 10.6 | 11.7 | 9.6 | 0.978 | 1.030 | 5.3% |
| C Ex Z | 3.5:1 | 8 | 4 | 100 | 16.9 | 18.7 | 3.4 | 0.974 | 1.029 | 5.7% |

TABLE 6

| Sample | Mole Ratio b(ii):b(i) | Viscosity (mPa*s) 25° C. | 60° C. | % T | Storage Modulus (kPa) 25° C. | 80° C. | Adhesion Strength (N/m) | $SG_L$ | $SG_S$ | % Shrinkage |
|---|---|---|---|---|---|---|---|---|---|---|
| Ex 1 | 7.9:1 | 64 | 19 | 100 | 28.4 | 14.7 | 240.9 | 1.082 | 1.140 | 5.4% |
| Ex 2 | 3.5:1 | 52 | 16 | 101 | 26.0 | 15.9 | 218.1 | 1.090 | 1.148 | 5.3% |
| Ex 3 | 0:1 | 35 | 12 | 98 | 11.3 | 10.2 | 67.8 | 1.128 | 1.190 | 5.5% |
| Ex 4 | 0:1 | 357 | 62 | 101 | 30.7 | 25.0 | 716.3 | 1.177 | 1.226 | 4.2% |
| Ex 5 | 0.5:1 | 30 | 9 | 100 | 35.0 | 32.2 | 81.6 | 1.058 | 1.112 | 5.1% |
| Ex 6 | 0.4:1 | 21 | 4 | 100 | 41.5 | 36.9 | 315.9 | 1.095 | 1.160 | 6.0% |
| Ex 7 | 18:1 | 12 | 7 | 100 | 10.7 | 10.0 | 72.2 | 1.010 | 1.078 | 6.7% |
| Ex 8 | 8.6:1 | 14 | 8 | 102 | 11.9 | 9.0 | 130.9 | 1.014 | 1.083 | 6.9% |
| Ex 9 | 3.5:1 | 16 | 9 | 102 | 14.3 | 11.2 | 554.2 | 1.023 | 1.096 | 7.1% |
| Ex 10 | 1.4:1 | 19 | 9 | 102 | 35.2 | 16.4 | 563.3 | 1.041 | 1.120 | 7.6% |
| Ex 11 | 2.4:1 | 67 | 21 | 101 | 80.0 | 19.5 | 998.0 | 1.094 | 1.158 | 5.9% |
| Ex 12 | 3.3:1 | 16 | 6 | 102 | 21.6 | 18.8 | 210.0 | 1.027 | 1.097 | 6.8% |
| Ex 13 | 2.1:1 | 18 | 2 | 101 | 47.6 | 24.8 | 642.8 | 1.052 | 1.121 | 6.6% |
| Ex 14 | 0:1 | 21 | 8 | 102 | 33.5 | 26.9 | 97.9 | 1.099 | 1.174 | 6.9% |
| Ex 15 | 0.4:1 | 55 | 14 | 101 | 84.0 | 32.6 | 1150.0 | 1.081 | 1.141 | 5.5% |
| Ex 16 | 2.9:1 | 16 | 10 | 99 | 343.0 | 430.0 | 112.5 | 0.945 | 1.015 | 7.4% |
| Ex 17 | 3.5:1 | 14 | 6 | 102 | 35.0 | 22.3 | 874.0 | 1.025 | 1.096 | 7.0% |
| Ex 18 | 3.5:1 | 14 | 6 | 102 | 41.5 | 27.1 | 251.1 | 1.025 | 1.098 | 7.2% |
| Ex 19 | 3.4:1 | 14 | 6 | 102 | 42.5 | 20.5 | 796.3 | 1.016 | 1.079 | 6.2% |
| Ex 20 | 3.5:1 | 17 | 7 | 101 | 39.4 | 30.1 | 382.2 | 1.016 | 1.075 | 5.8% |
| Ex 21 | 0:1 | 2908 | 293 | 101 | 6.4 | 1.2 | 150.5 | 1.176 | 1.204 | 2.4% |
| Ex 22 | 3.5:1 | 14 | 6 | 101 | 34.5 | 17.1 | 233.8 | 1.025 | 1.096 | 7.0% |
| Ex 23 | 3.5:1 | 14 | 5 | 102 | 42.1 | 28.4 | 211.1 | 1.028 | 1.099 | 6.9% |
| Ex 24 | 0:1 | 6541 | 405 | 101 | 14.2 | 3.5 | 277.1 | 1.199 | 1.225 | 2.2% |
| Ex 25 | 0:1 | 342 | 50 | 101 | 20.7 | 9.9 | 323.2 | 1.169 | 1.215 | 4.0% |
| Ex 26 | 3.5:1 | 27 | 10 | 100 | 41.9 | 25.2 | 179.6 | 1.018 | 1.090 | 7.1% |
| Ex 27 | 0.6:1 | 20 | 8 | 101 | 1200 | 40.1 | 161.8 | 1.098 | 1.170 | 6.6% |
| Ex 28 | 0:1 | 26720 | 4453 | 100 | 143.0 | 2.9 | 525.7 | 1.181 | 1.211 | 2.6% |
| Ex 29 | 0:1 | 4895 | 816 | 101 | 4.5 | 2.6 | 180.5 | 1.175 | 1.207 | 2.8% |
| Ex 30 | 0:1 | 193 | 32 | 100 | 29.5 | 16.5 | 464.3 | 1.153 | 1.202 | 4.3% |
| Ex 31 | 3.3:1 | 14 | 6 | 102 | 7.5 | 7.4 | 122.0 | 1.029 | 1.101 | 7.0% |

What is claimed is:

1. A composition comprising the following components:

(a) 10 to 90 mass-percent of an organopolysiloxane resin containing at least 60 mole-percent T siloxane units where the molar ratio alkyl groups to aryl groups in the organopolysiloxane resin is in a range of 0:1 to 4:1;

(b) 10 to 90 mass-percent of a (meth) acrylate component consisting of:

(i) at least one monofunctional (meth) acrylate that contains an ether group and/or a hydroxyl group; and optionally (ii) at least one monofunctional (meth) acrylate containing alkyl groups and that is free of ether and hydroxyl groups;

where the molar ratio of (ii) to (i) is in a range of 0:1 to 22:1 and wherein when the (meth) acrylate component comprises a monofunctional (meth) acrylate that contains a hydroxyl group then it also comprises as part of component (i) at least one of a monofunctional (meth) acrylate that contains an ether group and/or component (ii) a monofunctional (meth) acrylate containing alkyl groups and that is free of ether and hydroxyl groups;

(c) 0.1 to 11 mass-percent of a crosslinker having an average of at least two ethylenically unsaturated double bonds per molecule; and (d) 0.1 to 10 mass-percent of a photoradical initiator;

where mass-percentages are relative to the combined mass of components (a)-(c) and wherein the mass percentage of components (a)-(c) add up to 100 mass-percent.

2. The composition of claim 1, wherein the concentration of the component (a) is 10 to 60 mass percent and the combined concentration of component (b) and component (c) is 40-90 mass-percent relative to the combine mass of components (a)-(c).

3. The composition of claim 1, wherein component (a) has an average chemical composition (I):

$$M_a D_b T_c Q_d \qquad (I)$$

where:

subscript a is the molar ratio of M siloxane units relative to moles of all siloxane units and has an average value in a range of zero to 0.35;

subscript b is the molar ratio of D siloxane units relative to moles of all siloxane units and has an average value in a range of zero to 0.35;

subscript c is the molar ratio of T siloxane units relative to moles of all siloxane units and has an average value in a range of 0.50 to 1.00;

subscript d is the molar ratio of Q siloxane units relative to moles of all siloxane units and has an average value in a range of zero to 0.50;

the sum of subscripts a+b+c+d is equal to 1.00;

the molar ratio of alkyl and aryl groups is in a range of 0:1 to 4:1;

the concentration of OZ groups is in a range of zero to 100 mole-percent based on moles of organopolysiloxane resin; and the ratio of subscripts a/c is in a range of zero to 0.5, the ratio of subscripts b/c is in a range of zero to 0.5; the ratio of subscript d/c is in a range of zero to 0.8.

4. The composition of claim 1, wherein component (b) (i) is one or a combination of more than one compound selected from (meth) acrylate functional ethylene glycol, (meth) acrylate functional propylene glycol, (meth) acrylate functional polyethers comprising multiple ethylene oxide and/or a propylene oxide units, and hydroxyl functional (meth) acrylate functional compounds.

5. The composition of claim 1, wherein component (c) is a compound comprising on average at least two ethylenically unsaturated double bonds where at least one of the ethylenically unsaturated double bonds is part of a (meth) acryloyloxy group.

6. The composition of claim 1, wherein the composition is free of plasticizer.

7. A process comprising using the composition of claim 1 as an adhesive, the process comprising the steps of applying the composition onto a first object and then applying a second object to the composition so as to sandwich the composition between and in contact with the first and second objects.

8. The process of claim 7, further comprising curing the composition while between and in contact with the first and second objects by exposing the composition to ultraviolet light.

9. The process of claim 7, further comprising pre-curing the composition by exposing the composition to ultraviolet light after applying the composition to the first object and before applying the second object to the composition.

10. The process of claim 7, wherein a concentration of the component (a) in the composition is 10 to 60 mass percent, a combined concentration of component (b) and component (c) is 40 to 90 mass-percent relative to the combined mass of components (a)-(c), and the composition is applied to the first object using an inkjet method.

* * * * *